Oct. 24, 1967   R. GIANNAMORE   3,349,314
INVERTER UTILIZING AN AUXILIARY CONTROLLED RECTIFIER FOR
COMMUTATING THE POWER CONTROLLED RECTIFIERS
Filed Sept. 14, 1965
2 Sheets-Sheet 1

INVENTOR
RONALD GIANNAMORE
BY
ATTORNEY

INVENTOR
RONALD GIANNAMORE
ATTORNEY

United States Patent Office 3,349,314
Patented Oct. 24, 1967

3,349,314
INVERTER UTILIZING AN AUXILIARY CONTROLLED RECTIFIER FOR COMMUTATING THE POWER CONTROLLED RECTIFIERS
Ronald Giannamore, Wapping, Conn., assignor to United Aircraft Corporation, East Hartford, Conn., a corporation of Delaware
Filed Sept. 14, 1965, Ser. No. 487,142
4 Claims. (Cl. 321—43)

This invention relates to an improvement for an inverter using power rectifiers. More specifically, it relates to an improved inverter wherein the power rectifier is turned off by use of an auxiliary control rectifier.

In the inverter filed, inversion from direct to alternating current in relatively high power ranges has been achieved using power rectifiers. In order to achieve pulse width modulated outputs, special controls are needed to control the conduction times of the power rectifiers. A typical example of a pulse width modulated inverter circuit is described in the patent to Francis Lawn 2,872,635. In the Lawn patent a control rectifier is used to extinguish the power rectifier by use of a commutating capacitor. The circuit of this invention constitutes an improvement over the circuits disclosed in the Lawn patent in that several components are eliminated such as the commutating capacitors.

The Lawn patent describes an inverter output circuit utilizing commutating capacitors between the control rectifier and the power rectifiers for transferring extinguishing signals. These capacitors in large power applications transfer high currents and are exposed to high voltages and are therefore bulky, weighty and add a considerable expense to the output power circuit. It is therefore considered an advantage if these capacitors can be removed and replaced with a simpler and less expensive network.

It is therefore an object of this invention to provide an improved rectifier output inverter circuit.

It is a further object of this invention to replace the conventional commutating capacitors between the control rectifier and the power rectifiers with a resonant network.

It is still another object of this invention to extinguish the control rectifier which controls the conduction time of a power rectifier with a series resonance network.

The nature of this invention and other objects will become readily apparent upon a review of the following description of the drawings, wherein:

FIGURE 1 describes the prior art output rectifier circuit.

Figure 1:
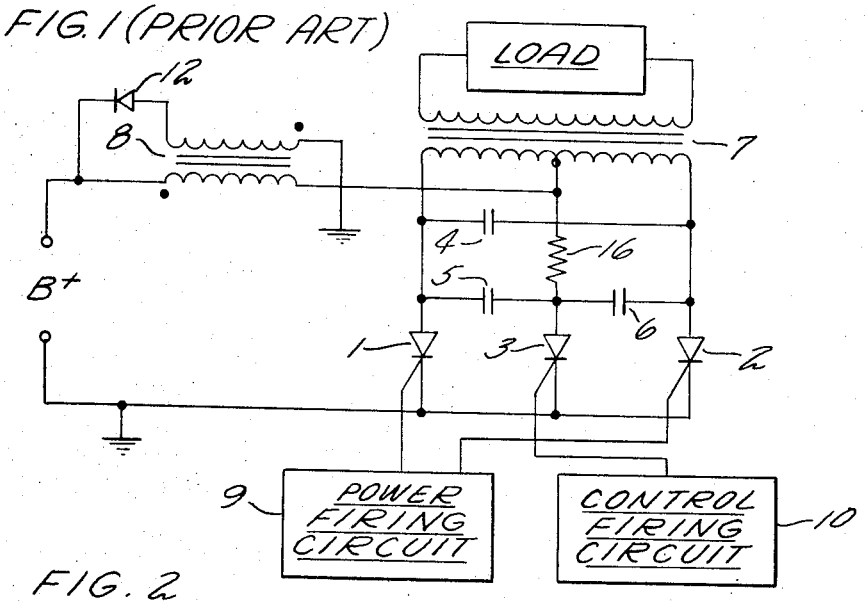

In FIGURE 1, the prior art inverter circuit utilizing silicon control rectifiers (SCR) is shown. In operation the power firing circuit 9 corresponds to the firing circuit described in column 2 of the Lawn patent. Similarly, the control firing circuit 10 used to extinguish the power silicon control rectifiers 1 and 2 is as described in column 2 of the Lawn patent. The power firing circuit 9 is connected to the control electrodes of the power SCR's 1 and 2. The cathodes of SCR's 1, 2 and 3 are connected together to a common terminal which is in turn connected to the return terminal of the B+ supply. The anode of power SCR's 1 and 2 are connected to the outside terminals of a center tapped primary of transformer 7. The center tap of the transformer is in turn connected through a choking coil 8 to the B+ terminal. The center tap is also connected through a resistor 16 to the control rectifier 3. The commutating capacitors 5 and 6 are connected between the anodes of the control rectifier 3 and power rectifiers 1 and 2, respectively. In addition, the wave shaping capacitor 4 is connected between the anodes of the power rectifiers. The choke 8 has a secondary which has one side connected to ground and the other side connected to B+ through a diode 12. This diode effectively clamps the center tap to B+ when either of the power SCR's are turned off.

In operation, the power firing circuit 9 provides turn on signals to the control electrodes of power rectifiers 1 and 2. These signals are 180° out of phase. Although the activation of silicon control rectifiers can be accomplished by a trigger signal on the control electrode, extinguishment requires a negative voltage between the cathode and the anode. Extinguishment of the power rectifiers is controlled by the control SCR 3. When SCR 3 is activated by the control firing circuit 10, it transfers the drop in voltage signal on its anode to the anode of the power rectifier via the commutating capacitors 5 or 6 so that the anode of the "on" power SCR is driven negative with respect to its cathode and thereby is extinguished. The control SCR 3 is in turn extinguished via the commutating capacitors 5 or 6 when the other power SCR is turned on by the power firing circuit 9.

The operation of the circuit of FIGURE 1 involves the flow of high switching currents through the resistor 16 which must have a high power rating. Furthermore, the commutating capacitors 5 and 6 also must carry high switching currents and are therefore bulky and expensive.

Figure 2:
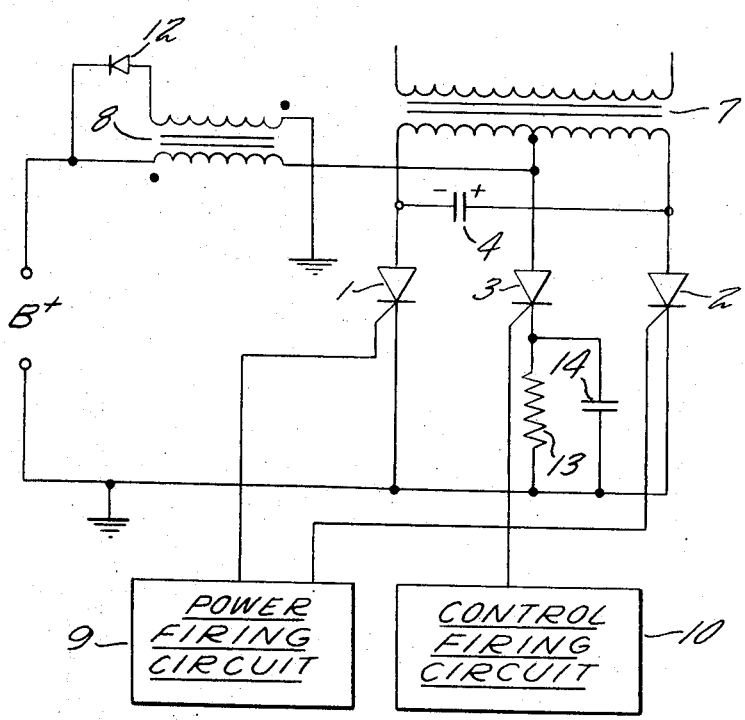
FIGURE 2 shows the improved circuitry of this invention.

The improvement of this invention as shown in FIGURE 2 avoids these disadvantages by deleting the commutating capacitors 5 and 6 as well as the resistor 16. In FIGURE 2 where components with similar functions as those in FIGURE 1 have been given similar numbers, the cathode of SCR 3 is shown connected to the return B+ terminal through a resistor 13 which is in parallel with a capacitor 14.

The capacitor 14 has a value which in combination with the inductance of choke 8 forms a series network which is operated near its resonance point. It is well known that with series resonance circuits there is a transfer of energy from the inductance to the capacitor and the voltage of the two reactance elements are essentially equal in amplitude but 180° out of phase. Thus, when the voltage across the inductance choke 8 is a minimum, the capacitor voltage is maximum and in effect a reversing voltage is placed across the SCR 3. If the resonance frequency is selected with some care, it will be low enough to place a reversing voltage across SCR 3 with sufficient duration for extinguishment. The frequency must also be low enough to avoid extinguishment of SCR 3 before it has had an opportunity to extinguish the power SCR 1 or SCR 2. On the other hand, the resonance frequency must be sufficiently high to avoid interference with the pulse width modulation of the power SCR's.

In operation of the circuit of FIGURE 2, assume that the SCR 1 is conducting as a result of a previous firing signal from power circuit 9. The voltage across the SCR 1 and SCR 2 anodes is then approximately zero and twice the B+ voltage. When the SCR 3 has been fired to conduct by the control circuitry 10, the center tap of the transformer 7 is brought to ground potential and thereby both the terminals of the primary side of transformer 7 are driven in a negative direction. Since the SCR 1 was conducting, its anode will be driven to a negative voltage with respect to its cathode because of a reversal of the polarity across that half of the transformer and similarly the anode voltage of power SCR 2 will drop to approximately B+. Since the power SCR 1 now has a negative voltage from its anode to the cathode, it will cease to conduct and power to SCR 1 from the main B+ supply through choke 8 and one half of the output transformer 7 is discontinued.

The initial conduction of control SCR 3 is maintained as long as the center tap voltage is larger than the voltage across the capacitor 14. Since the choke 8 and capacitor 14 are in series and operate at resonance when SCR 3 is turned on, approximately a half cycle later the voltage across the capacitor will be larger than the center tap voltage and the SCR 3 will be reverse biased and is extinguished.

Accordingly, the extinguishment of the control rectifier 3 has been substantially simplified and the commutating capacitors 5 and 6 have been eliminated. Furthermore, the current and voltage rating of the capacitor 14 has been considerably reduced compared to the commutating capacitors 5 and 6 by its placement in the novel circuit of FIGURE 2. Also, the power requirements of the output transformer 7 has been reduced since no current from the B+ supply can flow through the primary winding and the commutating capacitors 5 and 6 to SCR 3 during the period that the control rectifier 3 conducts. Similarly, the size of resistor 13 has been much reduced below that required for resistor 16. A saving in power and components is therefore obtained.

Figure 3:
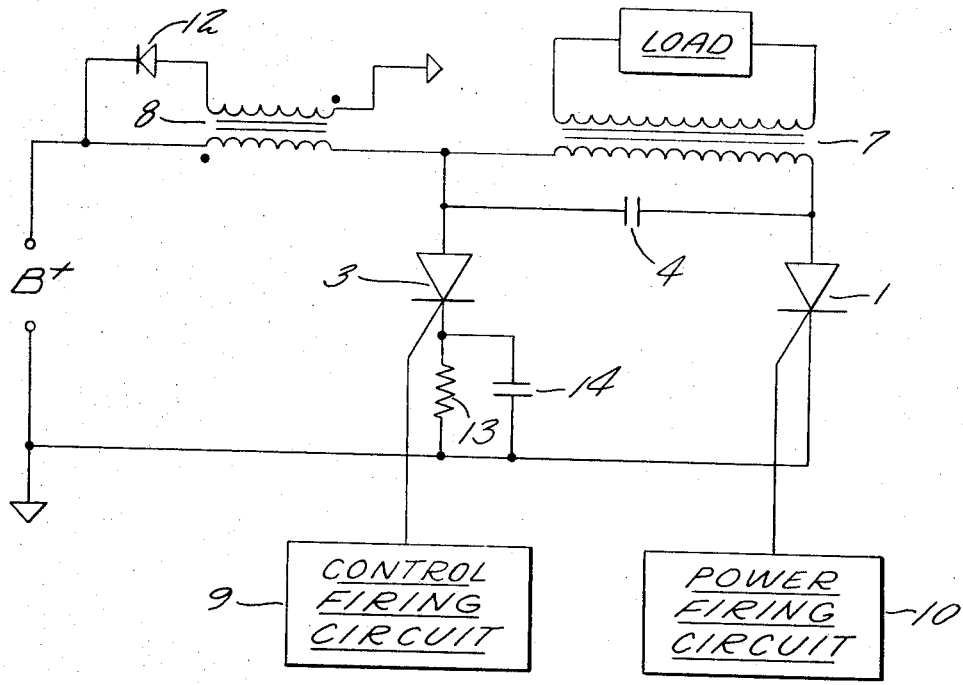
FIGURE 3 shows another embodiment of this invention.

FIGURE 3 shows another embodiment of this invention where instead of a parallel inverter circuit as that of FIGURE 2 a single power rectifier is used. The power SCR 1 has its anode connected to one terminal of the primary of transformer 7 and its cathode is connected to the return of the B+ supply. The control SCR 3 has its anode connected to the other terminal of the primary of transformer 7 and has its cathode connected to the B+ return terminal via a parallel combination of resistor 13 and capacitor 14. The choke 8 is connected to the anode of SCR 3 and to the active B+ terminal. The secondary of choke 8 and diode 12 are connected and operate similarly as in FIGURES 1 and 2.

Assuming in operation that SCR 1 is conducting, then its anode is approximately at ground potential and the SCR 3 anode is about at B+. When SCR 3 is turned on its anode is forced to ground since the capacitor 14 was discharged. The sudden conduction of SCR 3 forces the anode of SCR 1 negative with respect to its cathode and turning it off.

Since the capacitor 14 and choke 8 operate at resonance, a half cycler later, at the resonance frequency, the voltage across the control SCR 3 will be reversed and its anode will be negative with respect to its cathode resulting in shut-off.

It is to be understood that the invention is not limited to the specific embodiments herein illustrated and described but may be used in other ways without departure from its spirit as defined by the following claims.

I claim:
1. An inverter for supplying A.C. power to a load from a D.C. power supply,
   a power rectifier having a pair of main electrodes and a control electrode to activate the current flow between the pair of main electrodes,
   a control rectifier having a pair of main electrodes and a control electrode to activate the current flow between the pair of main electrodes,
   a transformer having a primary and a secondary, said secondary connected to the load and said primary electrically connected to one of the main electrodes of the power rectifier and electrically connected to a corresponding main electrode of the control rectifier,
   a series resonance circuit comprising a capacitive reactance and an inductive reactance,
   said inductive reactance operatively interconnecting the D.C. supply with the primary winding for supplying current through the primary to the one main electrode of the power rectifier,
   the primary winding side of the inductive reactance further operatively connected to the corresponding main electrode of the control rectifier,
   said capacitive reactance interconnecting the D.C. supply with the other main electrode of the control rectifier, and
   the other main electrode of the power rectifier electrically connected to the D.C. supply.

2. A device as recited in claim 1 wherein the capacitance reactance comprises:
   a capacitor, and
   a resistor connected in parallel with the capacitor.

3. A parallel inverter circuit for altering a source of D.C. current to an A.C. current source comprising:
   a transformer having a center tapped primary winding and a secondary winding,
   a plurality of power rectifiers each having an anode, a cathode and a control electrode for activating the flow of current from the anode to the cathode,
   a control rectifier having a pair of main electrodes and a control electrode for activating the flow of current between the main electrodes,
   said power rectifiers connected across the primary winding,
   one of the main electrodes of the control rectifier electrically connected to the center tap of the primary winding,
   a series resonance circuit comprising an inductive reactance and a capacitive reactance,
   said inductive reactance connected between the D.C. current source and the center tap of the primary, and
   said capacitive reactance connected between the D.C. current source and the other of the pair of main electrodes of the control rectifier.

4. A device as recited in claim 3 where the capacitive reactance comprises:
   a capacitor, and
   a resistor in parallel with the capacitor for discharging the capacitor after the control rectifier has been rendered nonconductive.

References Cited

UNITED STATES PATENTS

| | | | |
|---|---|---|---|
| 2,872,635 | 2/1959 | Lawn | 321—18 |
| 3,075,136 | 1/1963 | Jones | 321—45 |
| 3,222,587 | 12/1965 | Lichowsky | 321—45 X |
| 3,229,191 | 1/1966 | Williamson | 307—99 X |
| 3,263,153 | 7/1966 | Lawn | 321—45 |
| 3,315,146 | 4/1967 | Paice | 321—45 |

JOHN F. COUCH, *Primary Examiner.*

W. M. SHOOP, *Assistant Examiner.*